(12) United States Patent
Andersson et al.

(10) Patent No.: US 10,865,703 B2
(45) Date of Patent: Dec. 15, 2020

(54) CONDUIT CONNECTION ASSEMBLY WITH PRESSURE RELIEF

(71) Applicant: VOLVO TRUCK CORPORATION, Gothenburg (SE)

(72) Inventors: Peter Andersson, Södra Sandby (SE); Fredrik Rahm, Hörby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 102 days.

(21) Appl. No.: 16/301,074

(22) PCT Filed: Jan. 12, 2017

(86) PCT No.: PCT/EP2017/050518
§ 371 (c)(1),
(2) Date: Nov. 13, 2018

(87) PCT Pub. No.: WO2017/198350
PCT Pub. Date: Nov. 23, 2017

(65) Prior Publication Data
US 2020/0182136 A1 Jun. 11, 2020

Related U.S. Application Data

(63) Continuation of application No. PCT/EP2016/061482, filed on May 20, 2016.

(51) Int. Cl.
*F02B 37/02* (2006.01)
*F01M 11/02* (2006.01)
(Continued)

(52) U.S. Cl.
CPC .......... *F02B 37/025* (2013.01); *F01M 11/02* (2013.01); *F01N 13/10* (2013.01);
(Continued)

(58) Field of Classification Search
CPC ...... F02B 37/025; F02B 37/18; F02B 37/183; F02B 37/186; F02B 39/14; F01M 11/02;
(Continued)

(56) References Cited

U.S. PATENT DOCUMENTS

| | | | | |
|---|---|---|---|---|
| 3,137,477 A | * | 6/1964 | Kofink | F01D 17/165 |
| | | | | 415/166 |
| 3,507,506 A | * | 4/1970 | Tillman | F16L 23/20 |
| | | | | 277/614 |

(Continued)

FOREIGN PATENT DOCUMENTS

| | | |
|---|---|---|
| DE | 102014010090 A1 | 1/2016 |
| GB | 1164725 A | 9/1969 |
| WO | 2009109561 A1 | 9/2009 |

OTHER PUBLICATIONS

International Search Report (dated Mar. 7, 2017) for corresponding International App. PCT/EP2017/050518.

*Primary Examiner* — Thai Ba Trieu
(74) *Attorney, Agent, or Firm* — Venable LLP; Jeffri A. Kaminski

(57) ABSTRACT

A conduit connection assembly includes a first conduit component having a first mating structure and a second conduit component having a second mating structure adapted to be mated with the first mating structure. A sealing arrangement is provided for sealing between the mating structures. The sealing arrangement includes at least two spaced sealing members defining an intermediate space and the assembly includes a pressure relief opening arranged in communication with the intermediate space between the two spaced sealing members.

34 Claims, 13 Drawing Sheets

(51) Int. Cl.
*F01N 13/10* (2010.01)
*F01N 13/18* (2010.01)
*F02B 37/18* (2006.01)
*F02B 39/14* (2006.01)
*F02M 35/10* (2006.01)
*F16J 15/00* (2006.01)
*F16J 15/08* (2006.01)

(52) U.S. Cl.
CPC ...... *F01N 13/1811* (2013.01); *F01N 13/1827* (2013.01); *F02B 37/18* (2013.01); *F02B 39/14* (2013.01); *F02M 35/10157* (2013.01); *F16J 15/004* (2013.01); *F16J 15/0887* (2013.01); *F01M 2011/021* (2013.01)

(58) Field of Classification Search
CPC ............... F01M 2011/021; F01N 13/10; F01N 13/1811; F01N 13/1827; F02M 35/10157; F16J 15/004; F16F 15/0887
USPC ....... 60/602; 185/367–368, 412, 351; 277/2, 277/614; 415/205; 285/367–368, 412, 285/351
See application file for complete search history.

(56) References Cited

U.S. PATENT DOCUMENTS

| | | | | |
|---|---|---|---|---|
| 3,552,876 A | * | 1/1971 | Updike | F01D 9/026 415/205 |
| 3,554,581 A | * | 1/1971 | Mason et al. | F16L 23/08 285/367 |
| 3,557,549 A | * | 1/1971 | Webster | F02B 37/025 60/602 |
| 4,111,598 A | * | 9/1978 | Kasuya | F02B 37/025 415/205 |
| 4,294,073 A | * | 10/1981 | Neff | F02B 37/025 415/205 |
| 4,389,845 A | * | 6/1983 | Koike | F02B 37/025 60/602 |
| 4,395,884 A | * | 8/1983 | Price | F02B 37/025 60/602 |
| 5,197,766 A | | 3/1993 | Glover et al. | |
| 9,016,060 B2 | * | 4/2015 | Sauerstein | F02B 37/025 60/602 |
| 9,835,116 B2 | * | 12/2017 | Kuenzel | F01N 13/10 |
| 2009/0108543 A1 | | 4/2009 | Hittle | |
| 2011/0012338 A1 | | 1/2011 | Kitaguchi | |
| 2013/0111901 A1 | | 5/2013 | Leone et al. | |
| 2015/0240697 A1 | | 8/2015 | Smith et al. | |
| 2018/0299057 A1 | * | 10/2018 | Andersson | F01N 13/1827 |

* cited by examiner

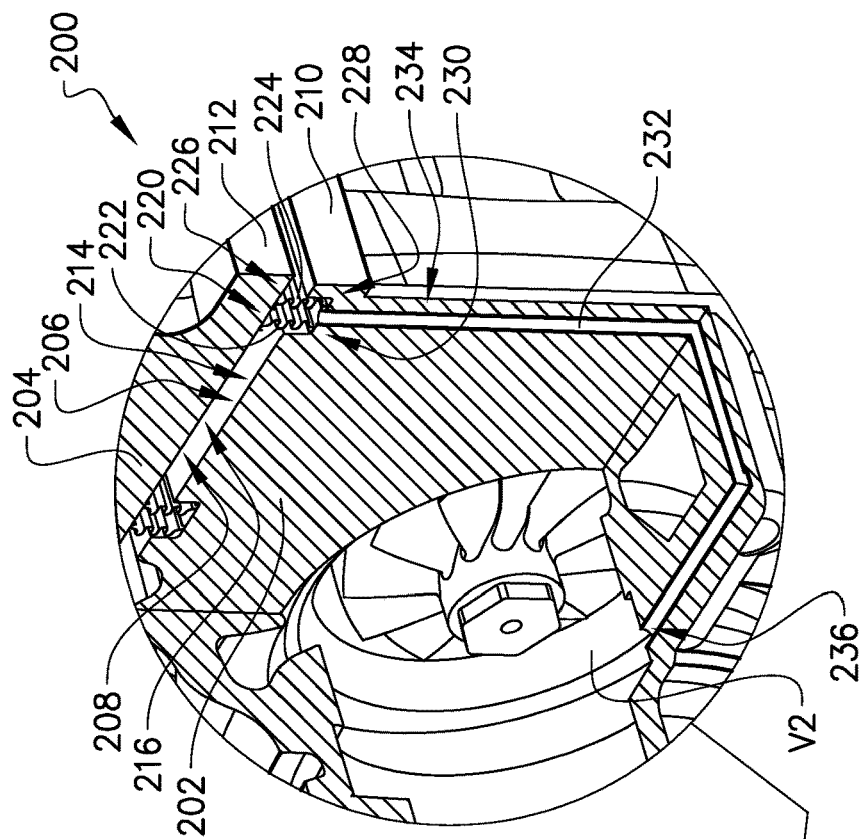
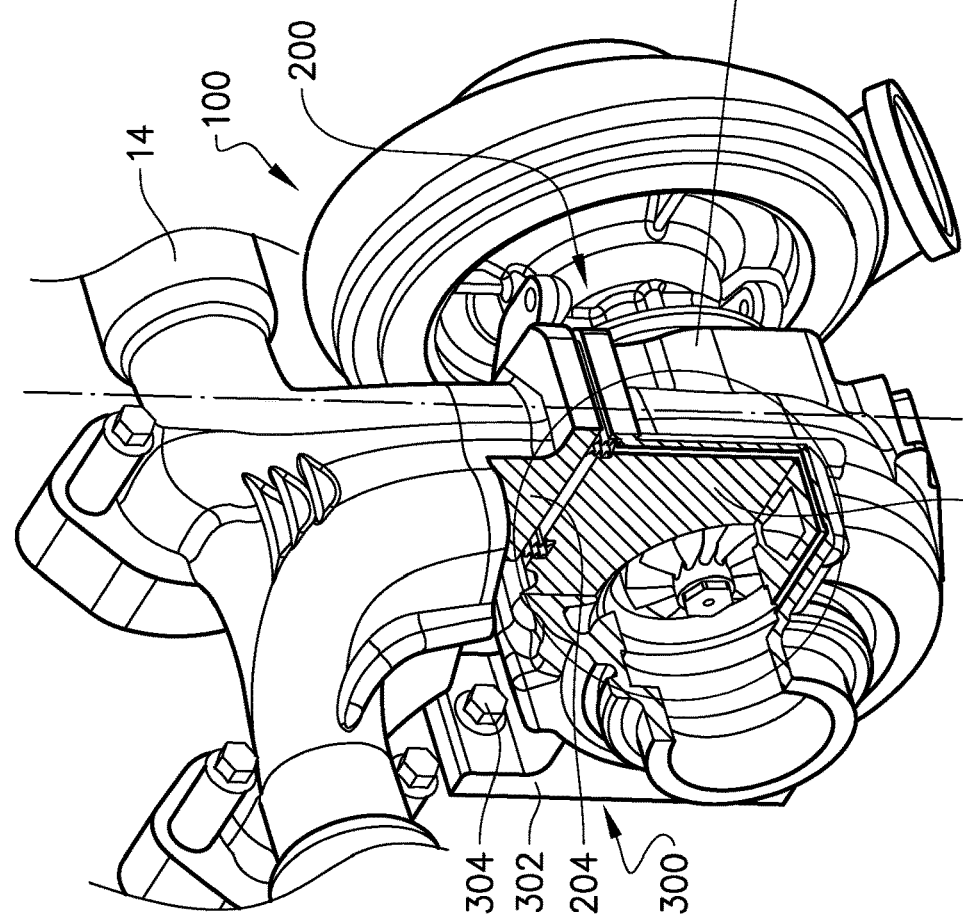
FIG. 4b
FIG. 4a

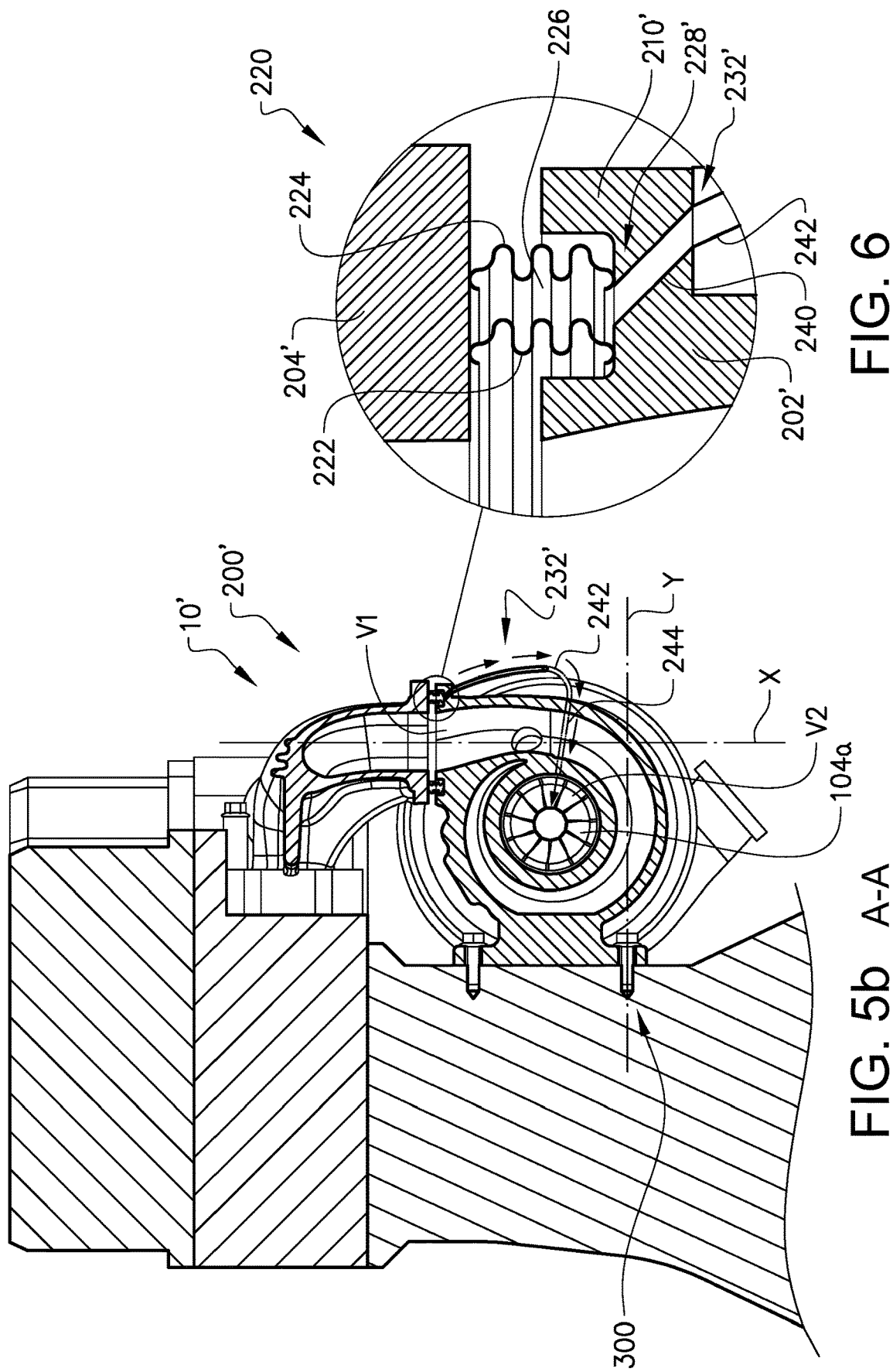

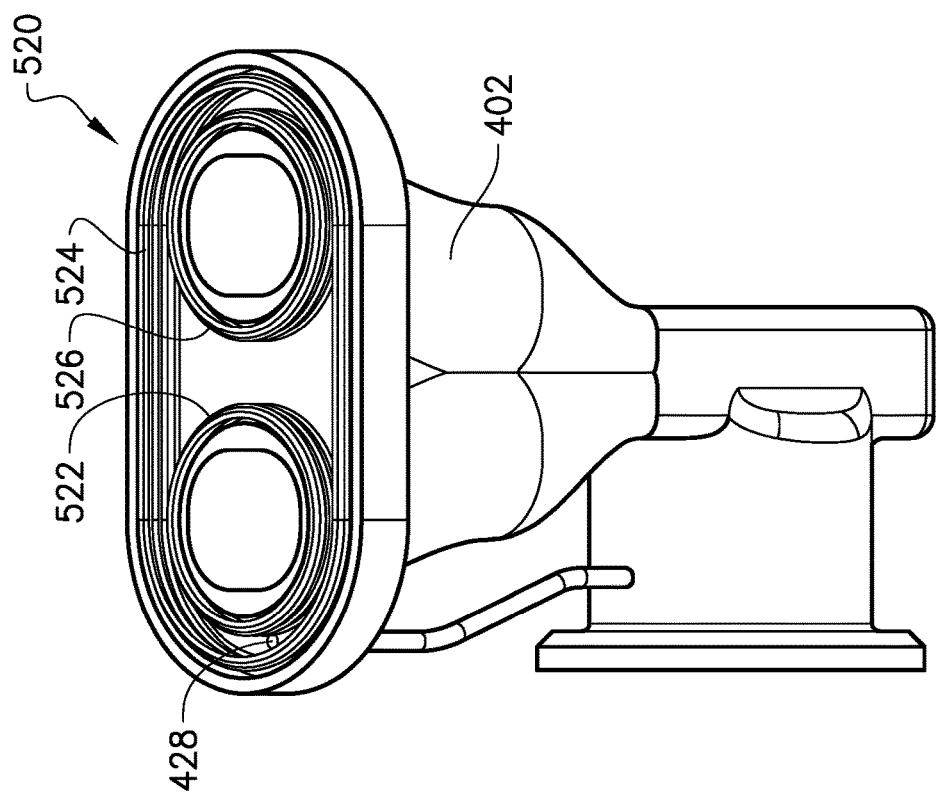
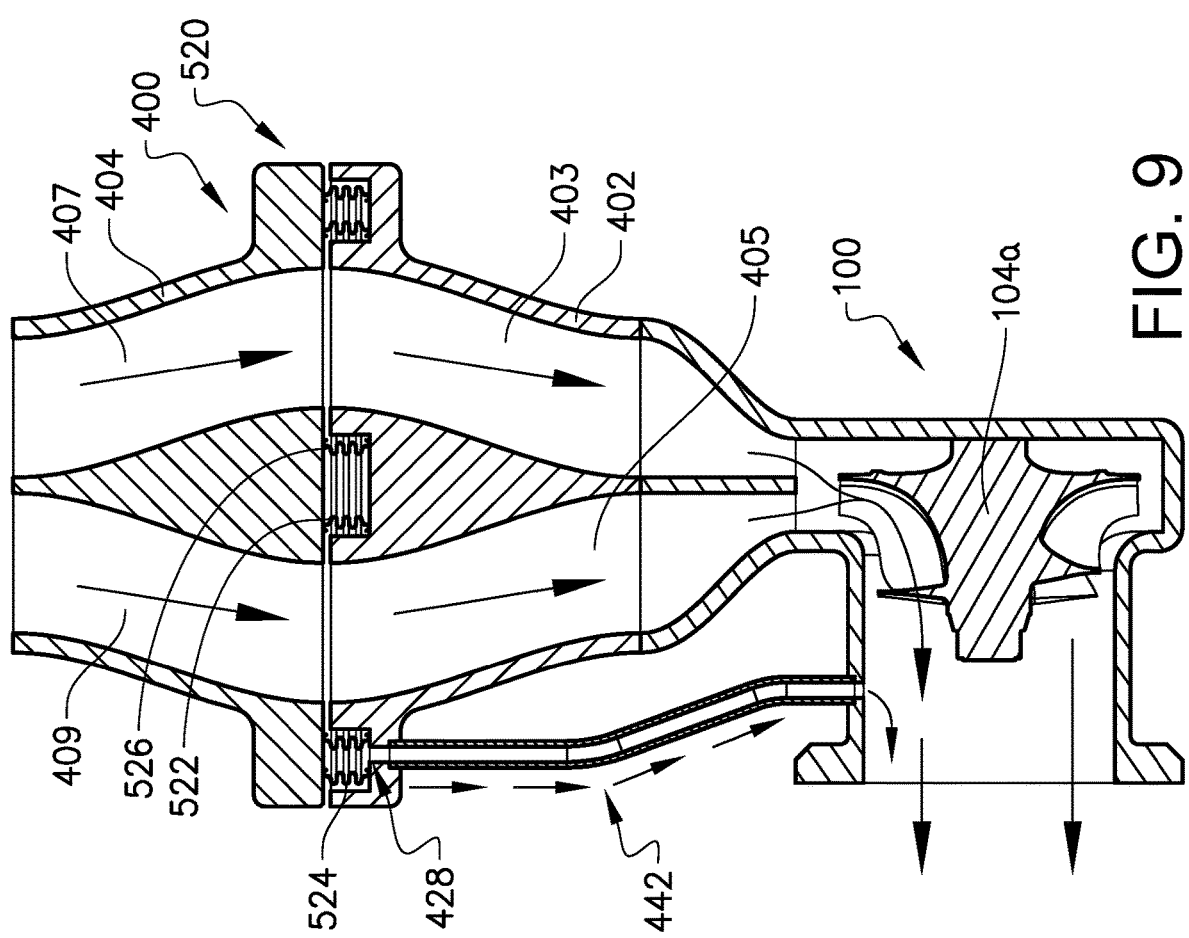
FIG. 10
FIG. 9

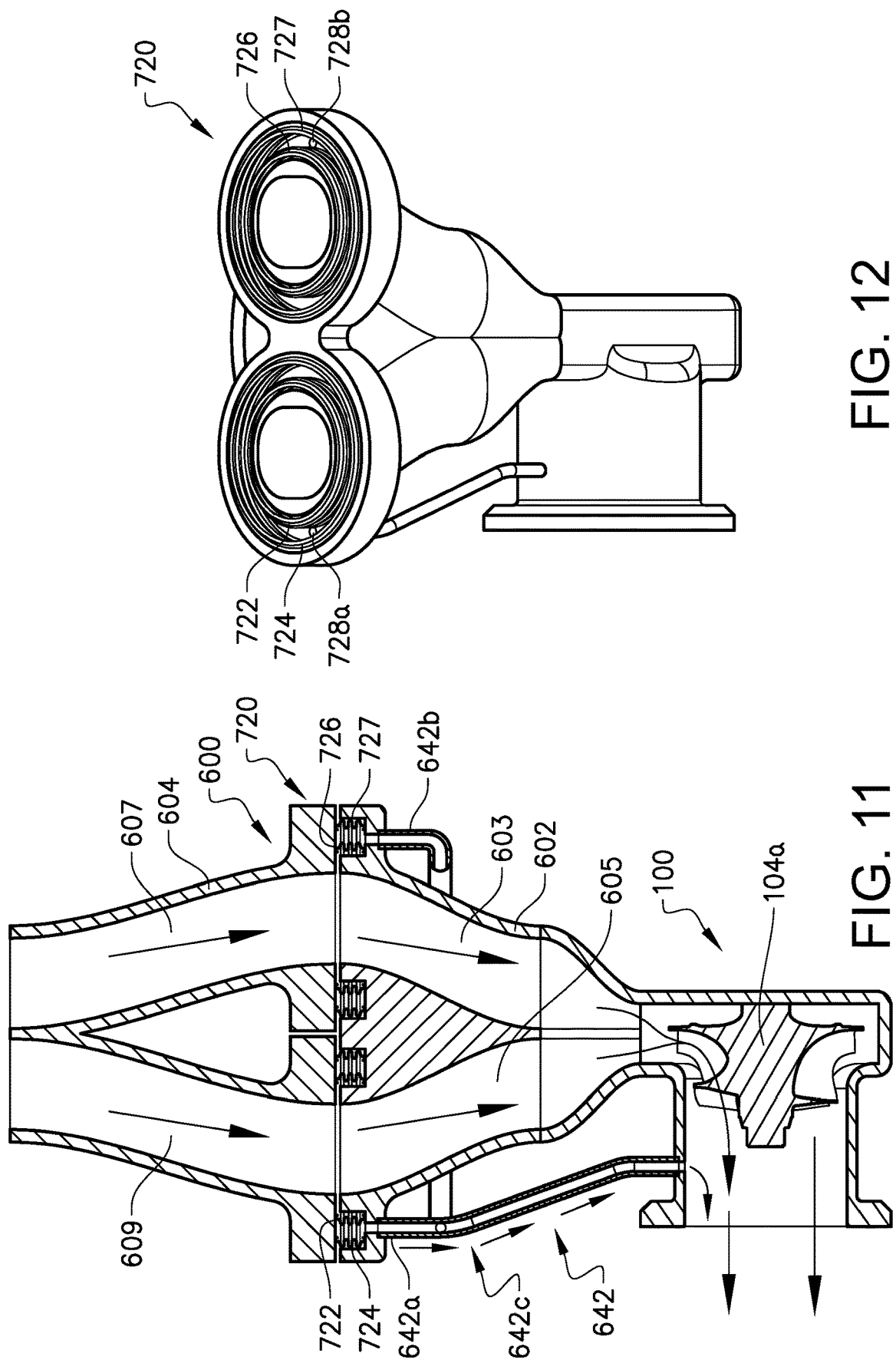

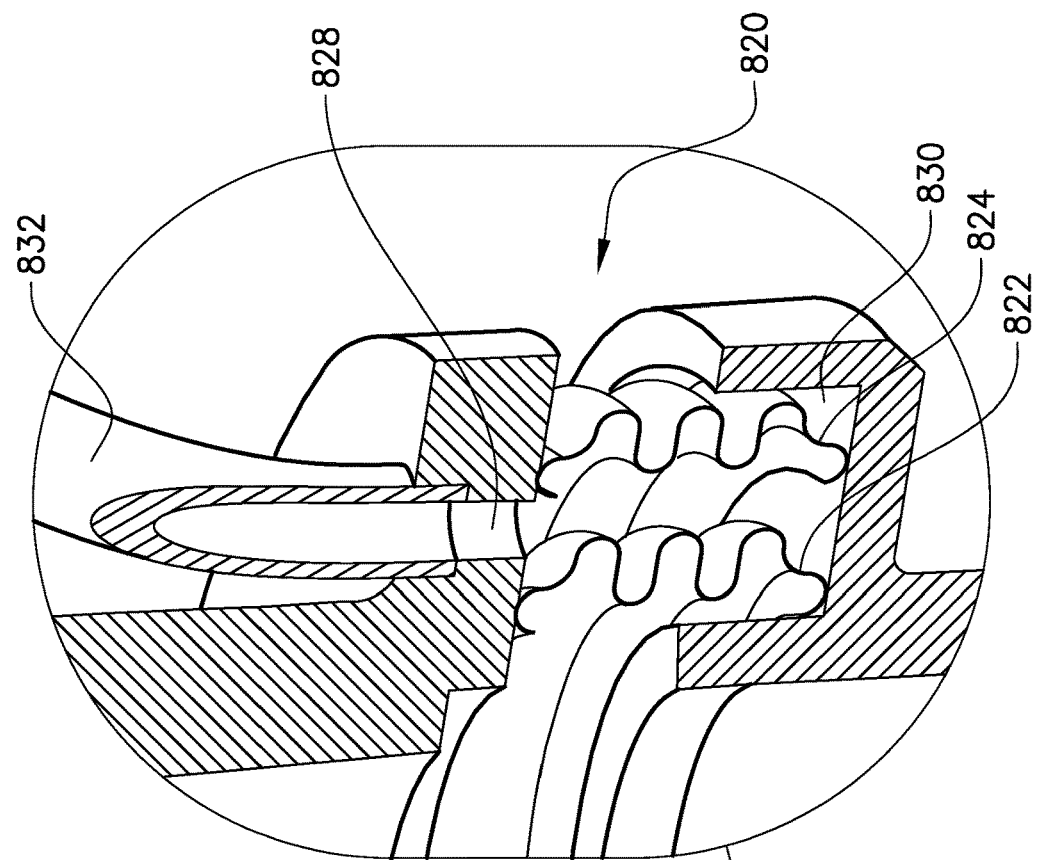
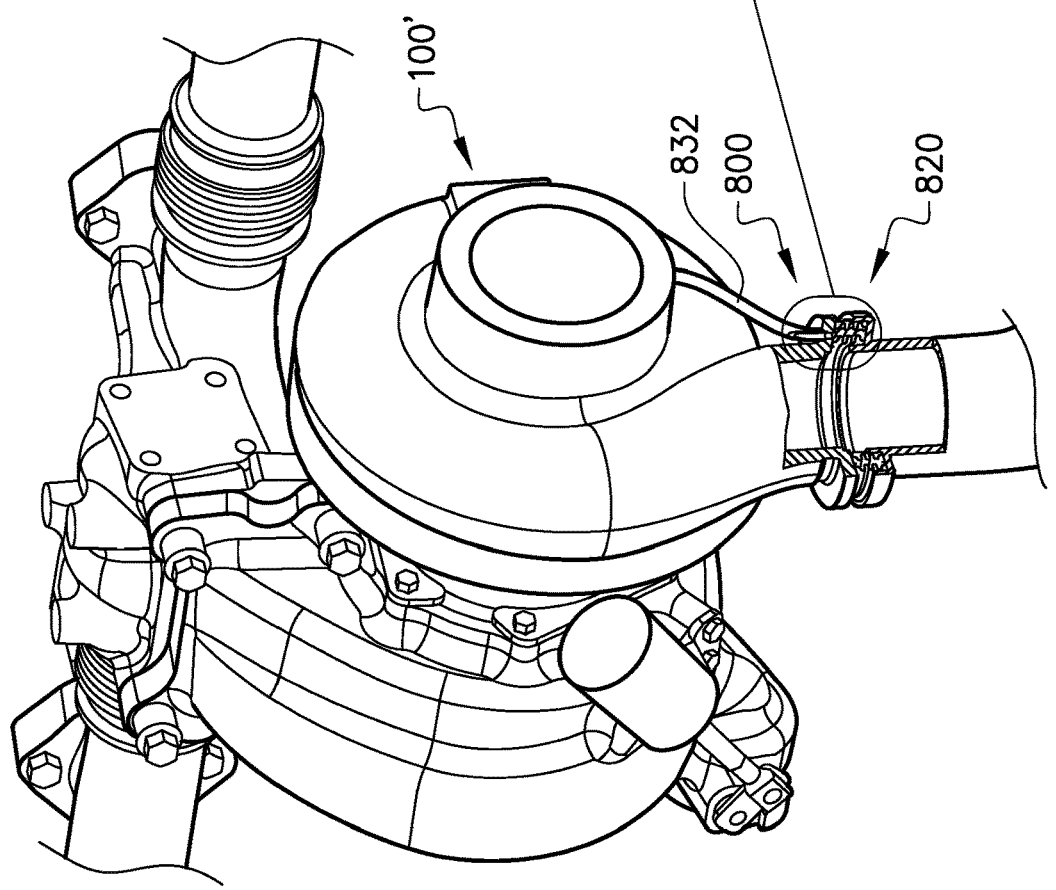
FIG. 14b
FIG. 14a

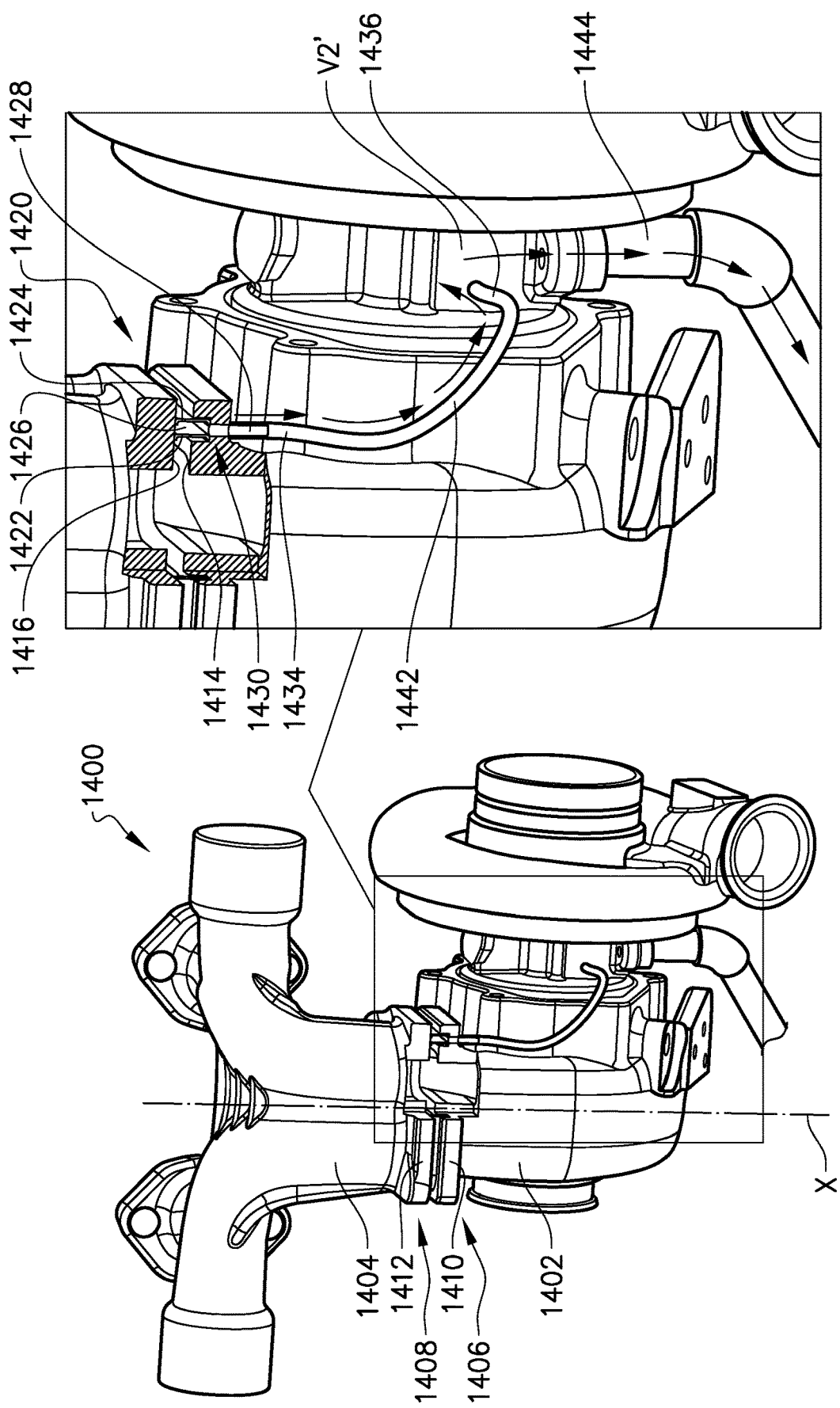

CONDUIT CONNECTION ASSEMBLY WITH PRESSURE RELIEF

BACKGROUND AND SUMMARY

The invention relates to a conduit connection assembly and an internal combustion engine system comprising the conduit connection assembly. The invention further relates to a conduit component, a turbo charger comprising the conduit component and an internal combustion engine system comprising the turbocharger.

The invention may be applied in the automotive industry and for example in heavy-duty vehicles, such as trucks, buses and construction equipment. Although the invention will be described with respect to a truck, the invention is not restricted to this particular vehicle, but may also be used in other applications utilizing turbocharger units such as aero or marine systems and in other non-turbo applications.

In a vehicle provided with an internal combustion engine, conduits provide air to the engine and guide exhaust gases from the engine.

A turbocharger is often used in conjunction with the internal combustion engine, typically a diesel or gasoline engine. The turbocharger is configured to recover a part of the energy of the exhaust gas and to use that energy to compress intake air to the combustion chamber of the internal combustion engine. Turbochargers are corn only provided for increasing the efficiency and power of the internal combustion engine.

A turbocharger has three main components; a turbine for converting energy of the exhaust gas flow to a rotational movement of the turbine, a compressor rotationally rigidly connected to the turbine via a shaft for compressing intake air, and a housing enclosing the turbine, compressor, shaft, bearings, etc. The housing may comprise three parts; a turbine housing, a compressor housing and a bearing housing provided between the turbine housing and the compressor housing.

The turbocharger is mounted to the cylinder head and an exhaust gas inlet of the turbine side is connected to an exhaust manifold of the internal combustion engine. A turbine housing inlet flange is usually clamped or bolted to an exhaust manifold outlet flange and the joint is sealed off by a gasket. The continuing pursuit for better engine performance has led to increased exhaust pressure and temperature which leads to an increased risk of exhaust leakage. This, in turn has resulted in the need for new gasket designs and materials.

The typical turbocharger/exhaust manifold joint design is two flat flange surfaces which are bolted together with the gasket in between. The gasket will in the conventional design be exposed to the exhaust flow i.e. the exhaust temperature and pressure.

It is desirable to achieve a conduit connection assembly, which is reliable with regard to leakage, allows for thermal expansion and creates conditions for applications allowing a relative displacement between the conduit components forming the assembly.

According to an aspect of the present invention, a conduit connection assembly comprises a first conduit component having a first mating structure and a second conduit component having a second mating structure adapted to be mated with the first mating structure and wherein the assembly comprises a sealing arrangement for sealing between the mating structures, characterized in that the sealing arrangement comprises at least two spaced sealing members defining an intermediate space and that the assembly comprises a pressure relief opening arranged in communication with the intermediate space between the two spaced sealing members.

The first conduit component and the second conduit component may be adapted for conveying an operational fluid, such as an exhaust gas from an engine or air to an engine, between the first conduit component and the second conduit component. During operation, some leakage of the conveyed fluid is allowed to pass the sealing member upstream the intermediate space but since the pressure may be significantly reduced in the space, negligible leakage is expected to pass the downstream sealing member to the surrounding environment.

The assembly creates conditions for flexibility between the two conduit components, especially to compensate for different thermal expansion in the assembly.

According to one example, the sealing members are axially compressible and may be formed by a folded structure, such as a bellows structure, wherein opposite sealing lip of the respective sealing member presses against opposite sealing surfaces of the opposing conduit components. Further, the first and second sealing members may be identical. Further, each one of the first and second sealing members may be formed by a folded metal tube.

This sealing arrangement is especially suited for a joint design allowing a relative displacement between the conduit components. Such a connection may be called "floating" in that the conduit components are not rigidly attached to each other (via for example a screw joint).

The invention is applicable not only on a joint on an engine exhaust side but also on a joint on an engine inlet side where temperatures are more moderate. In the latter case, the sealing material of the sealing members can be less advanced and achieved for example via rubber based O-rings.

According to one example, a single pressure relief opening is arranged in the space defined between the sealing members. According to a further example, the assembly comprises at least two pressure relief openings.

According to one example, the first conduit component is annular and delimits at least one first internal cavity for conducting a fluid. Likewise, the second conduit component is annular and delimits at least one second internal cavity for conducting the fluid. According to one example, each one of the first conduit component and the second conduit component is tubular. According to one example, a fluid conveying channel of each one of the first conduit component and the second conduit component has a round or oval internal cross sectional shape. Further, the internal cross section of the first conduit component and the second conduit component are matched with regard to shape and size for a smooth transition between the components in order to achieve a low resistance against a fluid flow. Further, the first conduit component and the second conduit component are adapted to form a conduit connection delimiting a first fluid conducting volume.

The sealing arrangement is adapted for sealing an interface formed between the mating structures. The intermediate space between the sealing members forms an intermediate volume in the assembly.

According to one example, the conduit connection assembly defines a first fluid conducting volume and is, in its assembled state, associated to a second fluid conducting volume, and the pressure relief opening is adapted to provide a communication between the intermediate space and the second fluid conducting volume. The second fluid conducting volume may be of a lower pressure than the first fluid conducting volume during operation, which creates conditions for no, or at least a low, leakage of fluid past the downwards sealing member.

According to a further development, the first fluid conducting volume is adapted to communicate with an internal combustion engine, whereby during operation of the internal combustion engine, the pressure in the first fluid conducting volume is higher than the pressure in the second fluid conducting volume. More specifically, the pressure relief opening may be adapted to provide a communication between the first and second fluid conducting volumes so that the first fluid conducting volume is upstream the second fluid conducting volume with regard to an exhaust flow from the engine.

According to a further development, in the assembled state of the assembly, the first fluid conducting volume may be partly formed by a turbine inlet conduit of a turbocharger for at internal combustion engine, and the second fluid conducting volume may be at least partly formed by a turbine outlet conduit of the turbocharger or a downstream component in the exhaust system.

According to one alternative, the pressure relief opening is arranged in the same conduit component as the sealing members. According to an alternative, the pressure relief opening is arranged in the other component facing the component provided with the sealing members.

According to one embodiment, each one of the two spaced sealing members is continuous in a circumferential direction of the conduit assembly. Further, each one of the two radially spaced sealing members being of a closed loop shape and extending around the fluid conducting volume. According to one alternative, the two spaced sealing members extend in a plane transverse to and especially perpendicular to an axial direction of the assembly. Further, the two spaced sealing members are arranged at different radial distances from a centre axis of the assembly.

The term "axial direction X of the assembly" may be defined as a desired flow direction of the fluid through the assembly.

According to a further embodiment, each one of the first mating structure and the second mating structure has a portion with an at least partially radial extension and wherein the sealing members are radially spaced. The radially extending portion may be formed by a flange.

According to a further embodiment, the first mating structure portion comprises a first mating surface and the second mating structure portion comprises a second mating surface, wherein each one of the first mating surface and the second mating surface has an extension transverse to and especially substantially perpendicular to an axial direction of the assembly and wherein the two radially spaced sealing members are arranged along this extension.

Each one of the first mating surface and the second mating surface may have a substantially flat part forming the extension. The flat part circumscribes a fluid conducting volume defined by the assembly. The flat part may form a circumferentially continuous part. It creates conditions for allowing a relative displacement between the conduit components during operation while securing a proper sealing effect.

According to a further embodiment, at least one of the first mating structure portion and the second mating structure portion comprises at least one recess and wherein the at least two spaced sealing components are positioned in the recess. According to one example, the recess extends in an axial direction of the assembly from an interface surface. According to one example, a single recess is provided, which houses both sealing members. According to an alternative example, two recesses are provided, wherein each recess houses a single sealing member. Further, the sealing member has a greater extension in the axial direction of the assembly than a depth of the recess so that the sealing member projects axially from the conduit component. In this way, the assembly may be designed so that the sealing member is in a compressed state (compressed between the first and second conduit components) in an operative condition.

According to a further embodiment, the recess is continuous in a circumferential direction of the conduit assembly. Preferably, the recess is of a closed loop shape and extending around the fluid conducting volume.

According to a further embodiment, the pressure relief opening is arranged in the recess. According to an alternative, the pressure relief opening is arranged in the other component facing the component provided with the pressure relief opening.

According to a further embodiment, the assembly comprises a fluid line, which at a first end is in communication with the pressure relief opening and at a second end is in communication with an environment of substantially lower pressure than a pressure on an internal side of the assembly. According to one example, the internal side of the assembly is formed by an interface between the first conduit component and the second conduit component during operation.

According to a further example, the environment of substantially lower pressure forms a part of a main conduit for an operational fluid (such as exhaust gas) to be conveyed between the first conduit component and the second conduit component.

According to a an alternative to the last-mentioned example, the environment of substantially lower pressure is separate from a main conduit for an operational fluid to be conveyed between the first conduit component and the second conduit component. For example, the environment of substantially lower pressure is formed by a space for collection of a secondary fluid. Further, the environment of substantially lower pressure may be formed by a space for collection of an oil for evacuation of the oil after use. More specifically, in the case of an engine equipped with a turbocharger, the oil collection space may be formed in a turbo, housing and especially in a turbo bearing housing.

According to a further embodiment, the first conduit component having a first radially projecting flange provided with the first mating structure and the second conduit component having a second radially projecting flange provided with the second mating structure.

According to a further embodiment, the first conduit component delimits at least two first internal cavities for conducting a fluid, wherein the second conduit component delimits at least two second internal cavities for conducting the fluid, wherein a first one of the two first internal cavities is in communication with a first one of the two second internal cavities and a second one of the two first internal cavities is in communication with a second one of the two second internal cavities and wherein the sealing arrangement comprises at least three radially spaced sealing members defining an intermediate space. Such an arrangement may be desirable for a twin entry turbocharger. Such a twin entry turbocharger may be of asymmetric type.

According to one example, a single pressure relief opening is arranged in the space defined between the third sealing member and the first and second sealing member.

According to a further embodiment, two first sealing members are arranged to delimit a first pair of the first and second internal cavities, wherein two second sealing members are arranged to delimit a second pair of the first and second internal cavities. According to one example, one pressure relief opening is arranged in the space defined between the two first sealing members and a further pressure relief opening is arranged in the space defined between the two second sealing members.

According to a further embodiment, the conduit connection assembly comprises means for fastening one of the first conduit component and second conduit component to an external structure. The fastening means is arranged for fastening the conduit connection assembly to the external structure may be arranged separate from the conduit connection assembly.

According to a further development of the last-mentioned embodiment, the fastening means is arranged for fastening the conduit connection assembly to the external structure in a direction, which is transverse in relation to an axial direction of the conduit connection assembly. The term "transverse" in relation to the axial direction should be interpreted to comprise any direction that differs from being parallel to the axial direction. According to one example, the fastening means is arranged for fastening the conduit connection assembly to the external structure in a direction, which is at least 30°, preferably at least 45°, especially at least 60°, and advantageously at least 75° inclined in relation to the axial direction of the conduit connection assembly. According to one example, the fastening means is arranged for fastening the conduit connection assembly to the external structure in a direction, which is perpendicular to the axial direction of the conduit connection assembly. Such a fastening direction may, in some applications, be preferable from an assembly point of view or with regard to the space available. According to one example, the turbocharger may comprise a housing having means for fastening the turbocharger unit to a cylinder block of an internal combustion engine. The housing may be a bearing housing rigidly attached to and between a turbine housing and a compressor housing. Alternatively, the housing may be formed by a turbine housing or a compressor housing.

According to a further embodiment, the conduit connection assembly defines a first fluid conducting volume and is, in its assembled state, associated to a second fluid conducting volume, and the pressure relief opening is adapted to provide a communication between the intermediate space and the second fluid conducting volume.

According to one embodiment, the first conduit component is a turbine inlet conduit of a turbocharger for an internal combustion engine. Accordingly, the second conduit component is an exhaust gas conveying part, e.g. an exhaust gas outlet manifold, adapted for conveying exhaust gases from an internal combustion engine.

According to a further embodiment, the first conduit component is a compressor outlet conduit of a turbocharger for an internal combustion engine. Accordingly, the second conduit component is an air inlet conduit for an internal combustion engine.

Alternatively the first conduit component is an intercooler for an air inlet of an internal combustion engine. According to a further alternative, the first conduit component is an internal combustion engine and the second conduit component is an air inlet manifold or an exhaust gas outlet manifold.

According to a further aspect of the invention, it relates to an internal combustion engine system comprising an internal combustion engine and the conduit connection assembly according to any one of the embodiments above.

According to a further aspect of the invention, a conduit component is provided, wherein the conduit component is adapted to be assembled to another conduit component, wherein the conduit component having a first mating structure for mating with a second mating structure of the another conduit component, characterized in that the first mating structure comprises a pressure relief opening for being arranged in communication with an intermediate space between two spaced sealing members of a sealing arrangement for sealing between the mating structures.

According to a further aspect of the invention, a turbocharger is provided comprising a conduit component according to any one of the above alternatives.

According to one embodiment, the turbocharger comprises means for fastening the turbocharger to an external structure and wherein the fastening means is arranged for fastening the turbocharger to the external structure in a direction, which is transverse in relation to an axial direction of the turbocharger.

According to a further aspect of the invention, an internal combustion engine system is provided comprising an internal combustion engine and a turbocharger according to any one of the embodiments above.

According to one embodiment, the system comprises a conduit component interface connection defines a first fluid conducting volume which is, in its assembled state, associated to a second fluid conducting volume, and the pressure relief opening is adapted to provide a communication between the first and second fluid conducting volumes.

According to one embodiment, the system comprises a fluid line, which at a first end is in communication with the pressure relief opening and at a second end adapted to be in communication with an environment of substantially lower pressure than a pressure prevailing on an internal side of the first mating structure during operation.

According to a further embodiment, the conduit connection component is adapted for being positioned on an upstream side of a turbine in the turbocharger and wherein the second end of the fluid pressure relief line is positioned in an exhaust line on a downstream side of the turbine.

Further advantages and advantageous features of the invention are disclosed in the following description and in the dependent claims.

DESCRIPTION OF DRAWINGS

Below embodiments of the invention will be described with reference to the drawings in which

FIGS. 4a and b are enlarged perspective views of a component connection assembly in FIG. 3, FIG. 5b is a view of the internal combustion engine system according to FIG. 5a cut along the plane A-A, FIG. 6 is a cut view of a sealing arrangement in FIG. 5b.

FIG. 9-10 show a first alternative design of a conduit connection assembly between the exhaust manifold and the turbocharger, FIG. 11-12 show a second alternative design of a conduit connection assembly between the exhaust manifold and the turbocharger.

DETAILED DESCRIPTION

Figure 1:
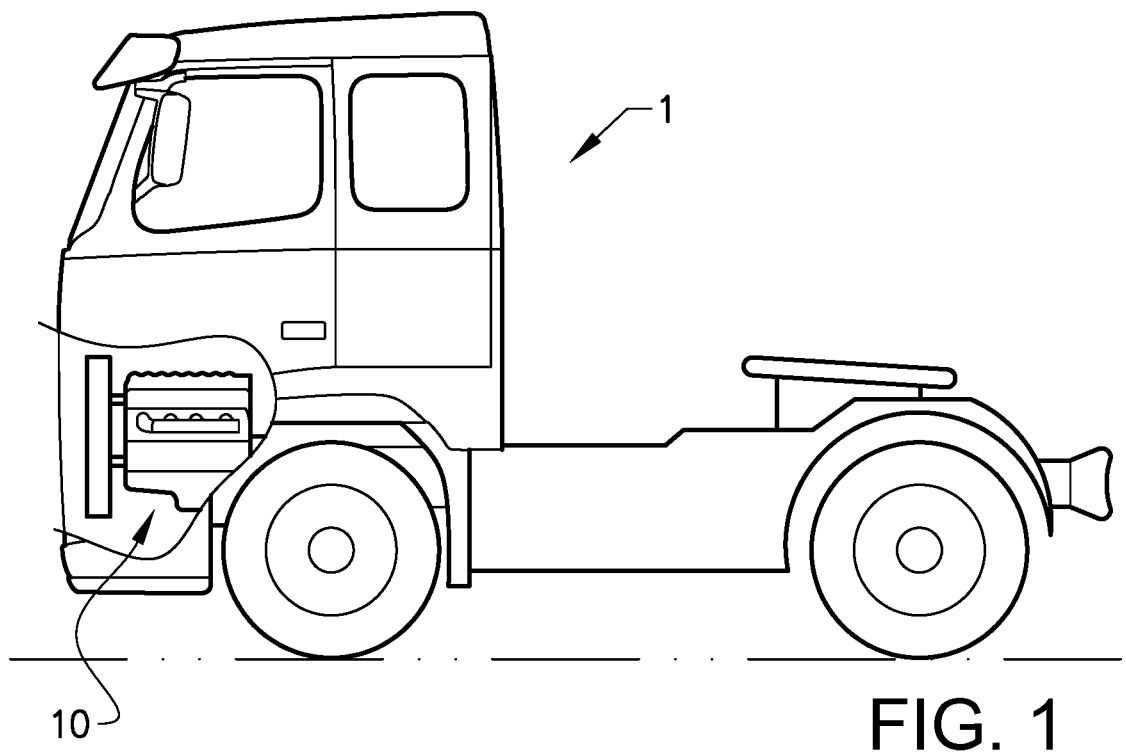
FIG. 1 is a side view of a vehicle in the form of a truck comprising an internal combustion engine system.
Figure 2:
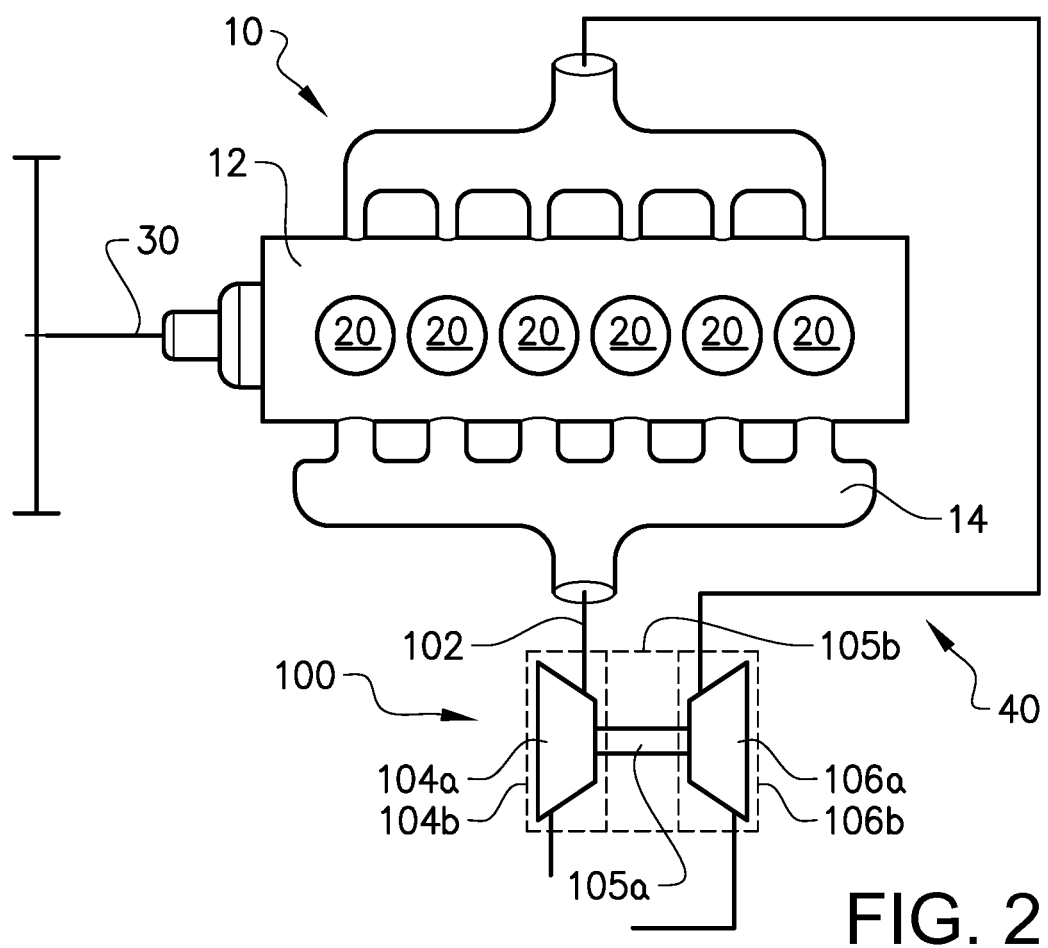
FIG. 2 is a schematic view of the internal combustion engine system in FIG. 1 according to a first embodiment.

FIG. 1 shows a vehicle 1 in the form of a truck in a partly cut side view. The vehicle 1 has an internal combustion engine system 10 for driving the vehicle 1. Turning now to FIG. 2, the internal combustion engine system 10 comprises an internal combustion engine 12 provided with a turbocharger 100.

The internal combustion engine 12 comprises a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 12 may also be used for other equipment such as construction equipment, marine applications, etc.

The internal combustion engine system 10 further comprises an exhaust gas arrangement 40, which serves the purpose of conveying exhaust gases and recovering at least some of the energy in the exhaust gas flow to improve the performance of the internal combustion engine 12. In the shown example the exhaust gas exits the cylinders 20 and enters an exhaust manifold 14 which is further connected to an exhaust inlet 102 of the turbocharger 100.

The turbocharger 100 comprises a turbine 104a arranged to be rotated by the exhaust gases from the engine 12. The turbocharger 100 further comprises a compressor 106a, which is rotationally rigidly connected to the turbine 104a via a shaft 105a. The compressor 106a is arranged on an air intake side of the engine 10 for compressing incoming air before it is introduced in the cylinders 20. The turbocharger 100 further comprises a turbine housing 104b, which houses the turbine 104a, a compressor housing 106b, which houses the compressor 106a, and a bearing housing 105b, which houses the shaft 105a, arranged between the turbine housing 104b and the compressor housing 106b and rigidly attached to the turbine housing 104b and the compressor housing 106b. The bearing housing 105b further forms a support for bearings, in order to allow the shaft to rotate with a minimum of friction and vibration. The basic structural as well as functional specifications of a turbocharger unit 100 are well known in the art and will not be described in full details.

Figure 3:
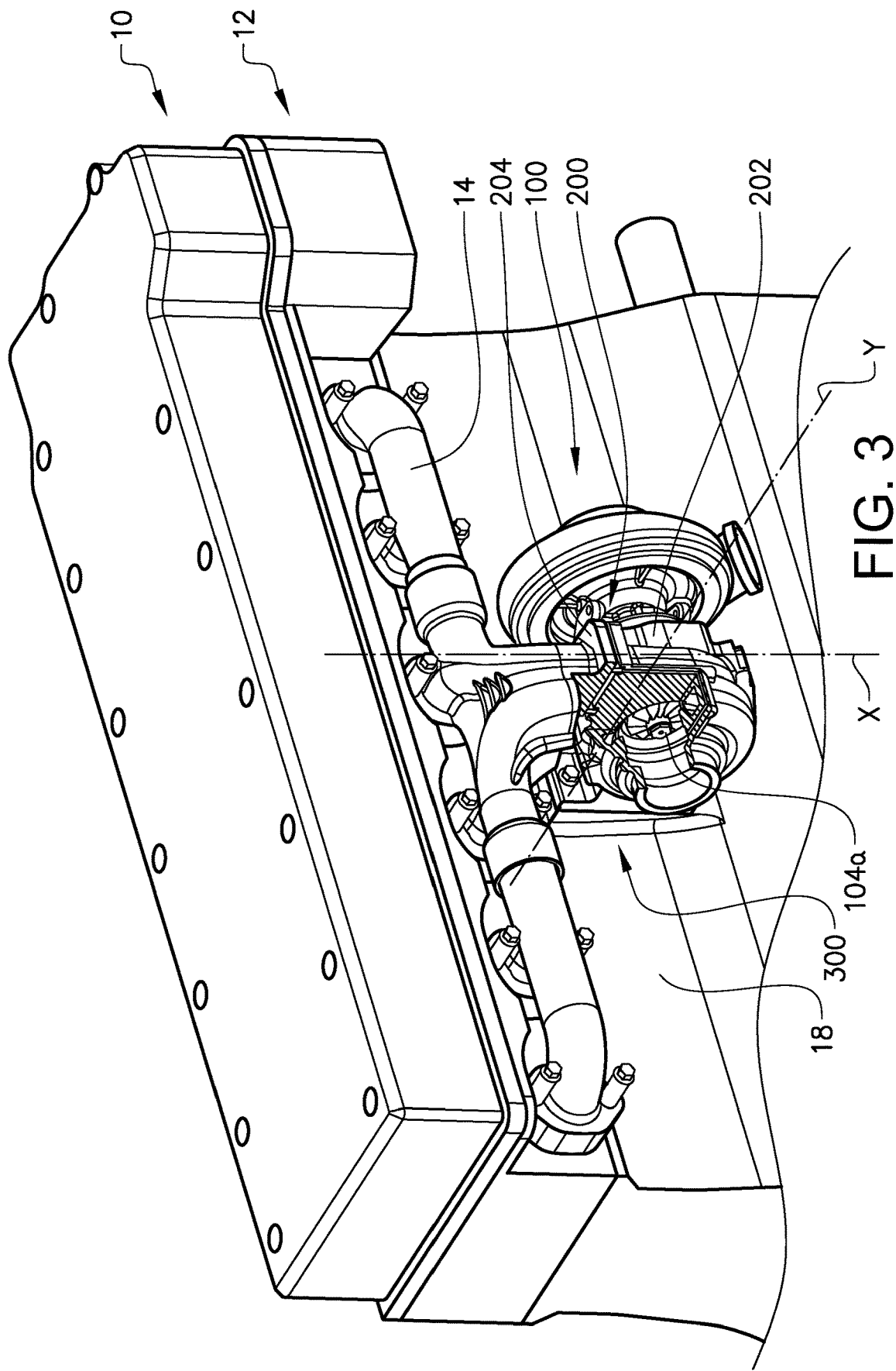
FIG. 3 is a partly cut perspective view of the internal combustion engine system in FIG. 2 comprising a turbocharger being attached to a cylinder block of the engine.

FIG. 3 is a partly cut perspective view of the internal combustion engine system 10 in FIG. 2 comprising the turbocharger 100 being attached to a cylinder block 18 of the engine 12. FIG. 4a and FIG. 4b are enlarged perspective views of a component connection assembly 200 in FIG. 3. The assembly 200 comprises a first conduit component 202 having a first mating structure 206 and a second conduit component 204 having a second mating structure 208 adapted to be mated with the first mating structure 206. The first conduit component 202 is a turbine inlet conduit of the turbocharger. The second conduit component 204 is an exhaust gas conveying part of the exhaust gas outlet manifold 14.

Figure 8:
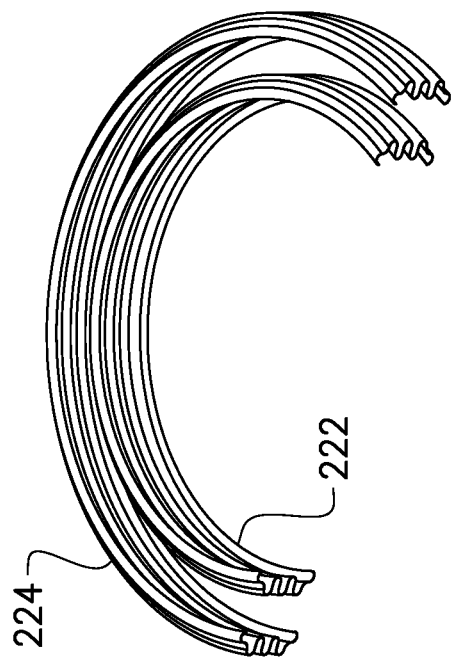
FIG. 8 is an enlarged perspective view of the scaling arrangement from FIG. 7.
Figure 7:
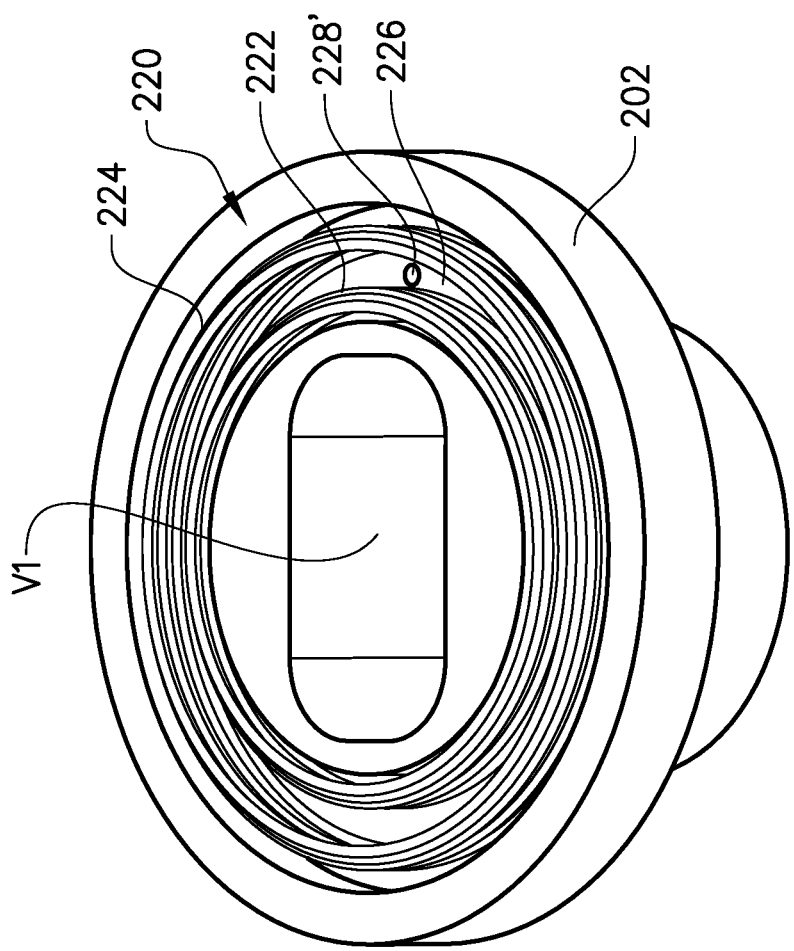
FIG. 7 is a perspective view of conduit portion of the turbocharger of FIG. 3 for being connected to a corresponding conduit portion of an exhaust manifold of the engine.

The assembly 200 further comprises a sealing arrangement 220 for sealing between the mating structures 204, 208, see also FIGS. 7-8. The sealing arrangement 220 comprises at least two spaced sealing members 222,224 defining an intermediate space 226. The sealing members 222,224 each provide a barrier between the exhaust gas flow and the ambient environment. The assembly 200 further comprises a pressure relief opening 228 arranged in communication with the intermediate space 226 between the two spaced sealing members 222,224.

Each one of the two spaced sealing members 222,224 is annular and preferably continuous in a circumferential direction of the conduit assembly. In other words, the sealing member 222,224 forms a ring. Further, the two spaced sealing members 222,224 extend in a plane transverse to and especially perpendicular to an axial direction X of the assembly 200.

Each one of the first mating structure 206 and the second mating structure 208 has a portion 210,212 with an at least partially radial extension and wherein the sealing members 222,224 are radially spaced between the mating structure portions 210,212. The first mating structure portion 210 comprises a first mating surface 214, 1414 and the second mating structure portion 212 comprises a second mating surface 216, 1416, wherein each one of the first mating surface 214 and the second mating surface 216 has an extension transverse to and especially substantially perpendicular to the axial direction X of the assembly and wherein the two radially spaced sealing members 222,224 are arranged along this extension. The sealing arrangement 220 is thus provided in a way sealing an axial gap between the conduit components 202,204. More specifically, the first mating structure portion 210 forms a first radially projecting flange provided and the second mating structure portion 212 forms a second radially projecting flange.

At least one of the first mating structure 206 and the second mating structure 208 comprises at least one recess 230 and wherein the at least two spaced sealing members 222,224 are positioned in said at least one recess 230, 830. More specifically, in the embodiment of FIGS. 4a-4b, the first mating structure 206 of the first conduit component 202 comprises the recess 230, while the second mating structure 208 does not have any such recess. Further, both sealing members 222, 224 are positioned in a single recess 230. The recess 230 is continuous in a circumferential direction of the conduit assembly 200. Thus, the recess 230 forms an annular groove. The recess 230 extends from the first mating surface 214, 1414 in the axial direction X. Further, the pressure relief opening 228 is arranged in the recess 230 and between said sealing members 222, 224.

The assembly 200 further comprises a fluid line 232, which at a first end 234 is in communication with the pressure relief opening 228 and at a second end 236 adapted to be in communication with an environment of substantially lower pressure than a pressure prevailing on an internal side of the assembly during operation. The fluid line 232 is formed in the first conduit portion 202 and more specifically the fluid line 232 is formed by a hole arrangement in the body of the first conduit portion 202. More specifically, the hole arrangement comprises a plurality of bores, which may be in the form of drilled holes, which are in communication with each other.

In other words, the conduit connection assembly 200 defines a first fluid conducting volume V1, see FIGS. 7-8, and is, in its assembled state, associated to a second fluid conducting volume V2 in the system. More specifically, the first fluid conducting volume V1 is, in its assembled state, in fluid connection with the second fluid conducting volume V2. In the illustrated embodiment, the first fluid conducting volume V1 is arranged upstream of the second fluid conducting volume V2 in the exhaust gas stream. The pressure relief opening is adapted to provide a communication between the intermediate space between the sealing members and the second fluid conducting volume V2.

Referring now to FIG. 3, the conduit connection assembly 200 comprises means 300 for fastening the first conduit component 202 to an external structure 18 in the form of the engine block. The fastening means 300 is arranged for fastening the first conduit component 202 to the external structure 18 in a direction Y, which is transverse in relation to the axial direction X of the conduit connection assembly 200. More specifically, the direction Y is perpendicular to the axial direction X. Further, the fastening means 300 is arranged separate from the conduit connection assembly 200. The fastening means 300 comprises a fastening portion 302 in the form of a flange with a plurality of holes for receipt of fasteners 304 in the form of screws. The external structure has a similar hole pattern as the fastening portion 302 for matching of the holes so that the fasteners may penetrate the holes of both parts. The fastening portion 302 is in one-piece with the turbine housing 104b.

The conduit connection assembly 200 is adapted for being positioned on an upstream side of the turbine 104a in the turbocharger and wherein the second end 236 of the fluid pressure relief line 232 is adapted to be positioned in an exhaust line on a downstream side of the turbine 104a.

Figure 5A:
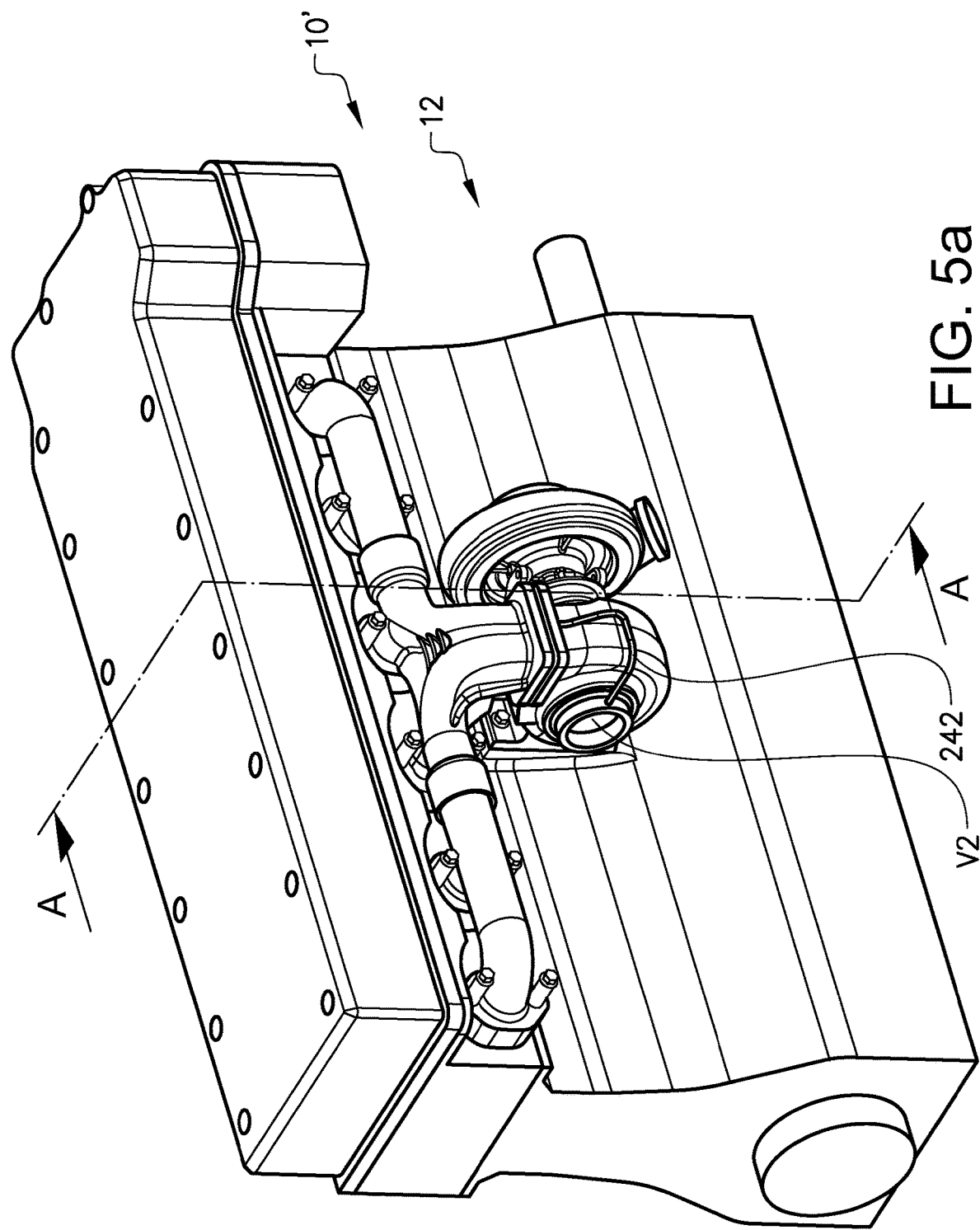
FIG. 5a is a side view of internal combustion engine system according to a second embodiment.

FIGS. 5a and 5b show an internal combustion engine system 10' according to a second embodiment in different views comprising a conduit connection assembly 200'. FIG. 6 is an enlarged cut view of the conduit connection assembly 200' comprising a sealing arrangement 220 similar to the one in the first embodiment. For ease of presentation, only the main differences in relation to the first embodiment will be described. A fluid line 232' comprises a first section 240 in the form of a hole running through the body of the first conduit part 202', a second tubular section 242 extending on an external side of the first conduit component 202 and a third section 244 in the form of a hole running through another part of the body of the first conduit part 202'. The first, second and third sections are in communication with each other for conveying the exhaust gas from the pressure relief opening 228' in consecutive order via the first, second and third sections. A flange 210' of the first conduit portion 202 projects radially. The first hole section 240 extends throughout the flange thickness. The tubular section 242 may be flexible.

FIG. 9-10 show a first alternative design of a conduit connection assembly 400 between the exhaust manifold 14 and the turbocharger 100. The first conduit component 402 delimits at least two spaced first internal cavities 403,405 for conducting a fluid, wherein the second conduit component 404 delimits at least two spaced second internal cavities 407,409 for conducting the fluid, wherein a first one 403 of the two first internal cavities is in communication with a first one 407 of the two second internal cavities and a second one 405 of the two first internal cavities is in communication with a second one 409 of the two second internal cavities.

The sealing arrangement 520 comprises at least three spaced sealing members 522,524,526 defining the intermediate space. A first sealing member 522 is arranged to encompass a first pair of the first and second internal cavities 405,409, wherein at least one second sealing member 526 is arranged to encompass a second pair of the first and second internal cavities 403,407, and wherein a third sealing member 524 is arranged to encompass both pairs of the first and second internal cavities. More specifically, the third sealing member 524 is arranged to encompass both the first and second sealing members 522,526. Each one of the first and second sealing members 522,526 has a substantially circular shape and the third sealing member 524 has an oval or elliptic shape.

A pressure relief opening 428 is arranged on an inside of the third sealing member 524 and on an outside of the first and second sealing members 522,526. Further, a fluid line 442 is arranged between and in communication with the pressure relief opening 428 and a downstream position of the turbine 104a.

FIG. 11-12 show a second alternative design of a conduit connection assembly 600 between the exhaust manifold 14 and the turbocharger 100. For ease of presentation, only the main differences in relation to the embodiment of FIGS. 9-10 will be described. A sealing arrangement 720 comprises a pair of two first sealing members 722,724 arranged to encompass a first pair of the first and second internal cavities and a pair of two second sealing members 726,727 arranged to encompass a second pair of the first and second internal cavities.

Further, the sealing arrangement 720 comprises two pressure relief openings 728a, 728b. A first pressure relief opening 728a is arranged between the two first sealing members 722,724. A second pressure relief opening 728b is arranged between the two second sealing members 726,727. Further, a fluid line 642 is arranged between and in communication with each one of the pressure relief openings 728a, 728b and a downstream position of the turbine 104a. More specifically, a first fluid line branch 642a is arranged in communication with the first pressure relief opening 728a and a second fluid line branch 642b is arranged in communication with the second pressure relief opening 728b. The first fluid line branch 642a and the second fluid line branch 642b are connected in a joint 642c.

Figure 13:
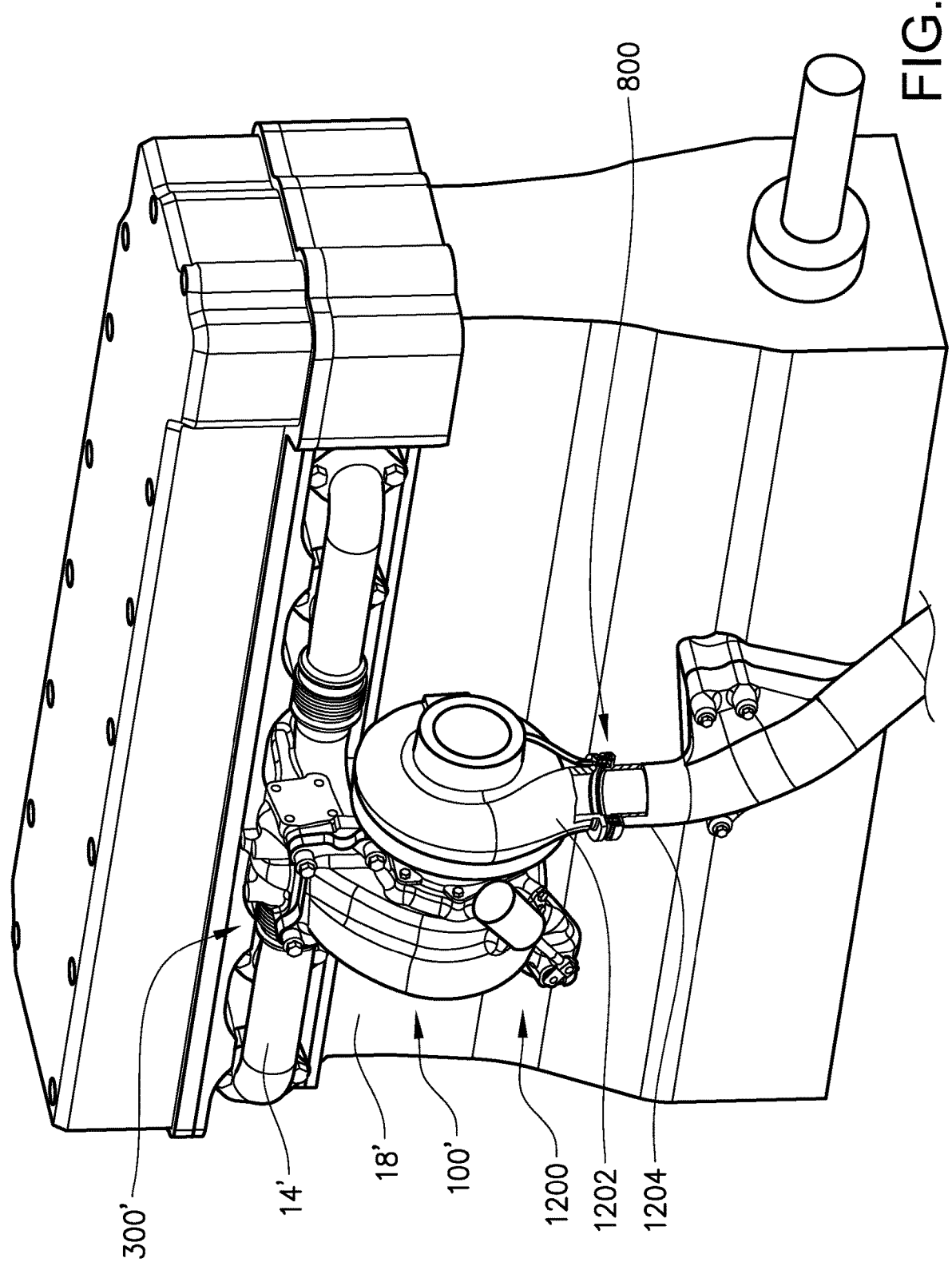
FIG. 13 shows an alternative arrangement of the turbocharger relative to the engine block in relation to FIG. 3, FIGS. 14a, 14b, 15a and 15b show two alternatives of a sealing arrangement for sealing between two conduit components in FIG. 13, FIG. 16a, 16b show a conduit connection assembly according to an alternative embodiment to the one according to FIGS. 9 and 10, and FIG. 17a, 17b show a conduit connection assembly according to a further embodiment.

FIG. 13 shows an alternative arrangement of a turbocharger 100' relative to the engine block 18' in relation to FIG. 3. More specifically, the turbocharger 100' is fastened to the engine block 18' via the exhaust, manifold 14'. An intake conduit portion of the turbine housing of the turbocharger is fastened to an outlet portion of the exhaust manifold 14' via a bolted flange connection 300'. Further, an inlet conduit 1202 of the compressor housing is connected to a conduit portion 1204 for conveying air to the internal combustion engine. Thus, the assembly 1200 comprises a first conduit component forming an inlet of the compressor and a second conduit component forming an air inlet conduit. The sealing arrangement 800, 820 may be similar to what has been described above, wherein it comprises a pair of sealing members 822,824 of a similar design as has been described above.

FIG. 14a, 14b show a first alternative of a sealing arrangement 820 for sealing between the two conduit components in FIG. 13. A fluid line 832 is, at a first end, in communication with a pressure relief opening 828 and at a second end in communication with a downstream side of the compressor. Further, the assembly comprises two sealing members 822, 824, which are designed and arranged in a similar way as the ones described above.

Figures 15A, 15B:
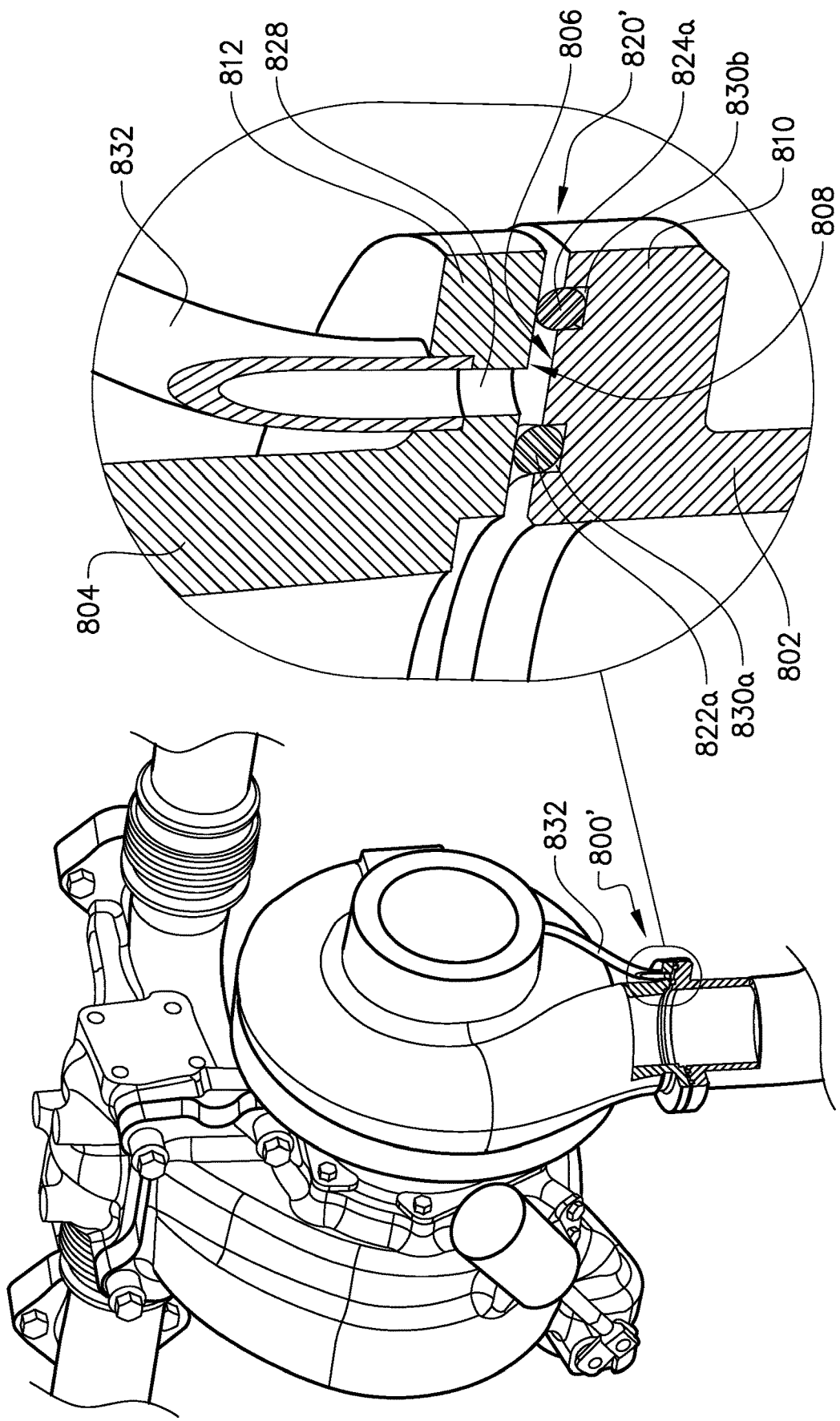

FIG. 15a, 15b show a second alternative of a sealing arrangement 820 for sealing between the two conduit components in FIG. 13. A first conduit component 802 has a first mating structure 806 and a second conduit component 804 has a second mating structure 808. More specifically, the first conduit component 802 has a first radially projecting flange 810 provided with the first mating structure 806 and the second conduit component 804 has a second radially projecting flange 812 provided with the second mating structure 808. Two recesses 830a and 830b are arranged in the conduit portion upstream of the compressor, wherein a sealing 822a, 824a is arranged in each one of the two recesses 830a and 830b. Due to the fact that the assembly is arranged on the cold side of the turbocharger, the sealing members 822a, 824a have a simpler design and are here shown in the form of rubber based O-rings.

Figure 16B:
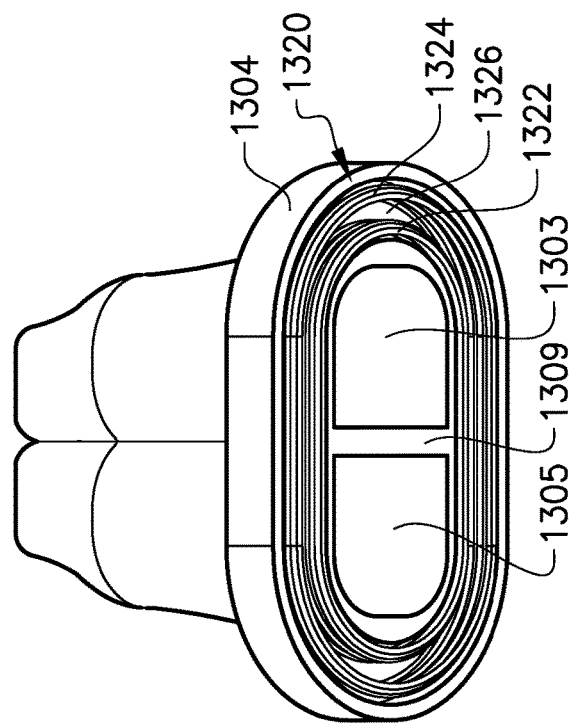
Figure 16A:
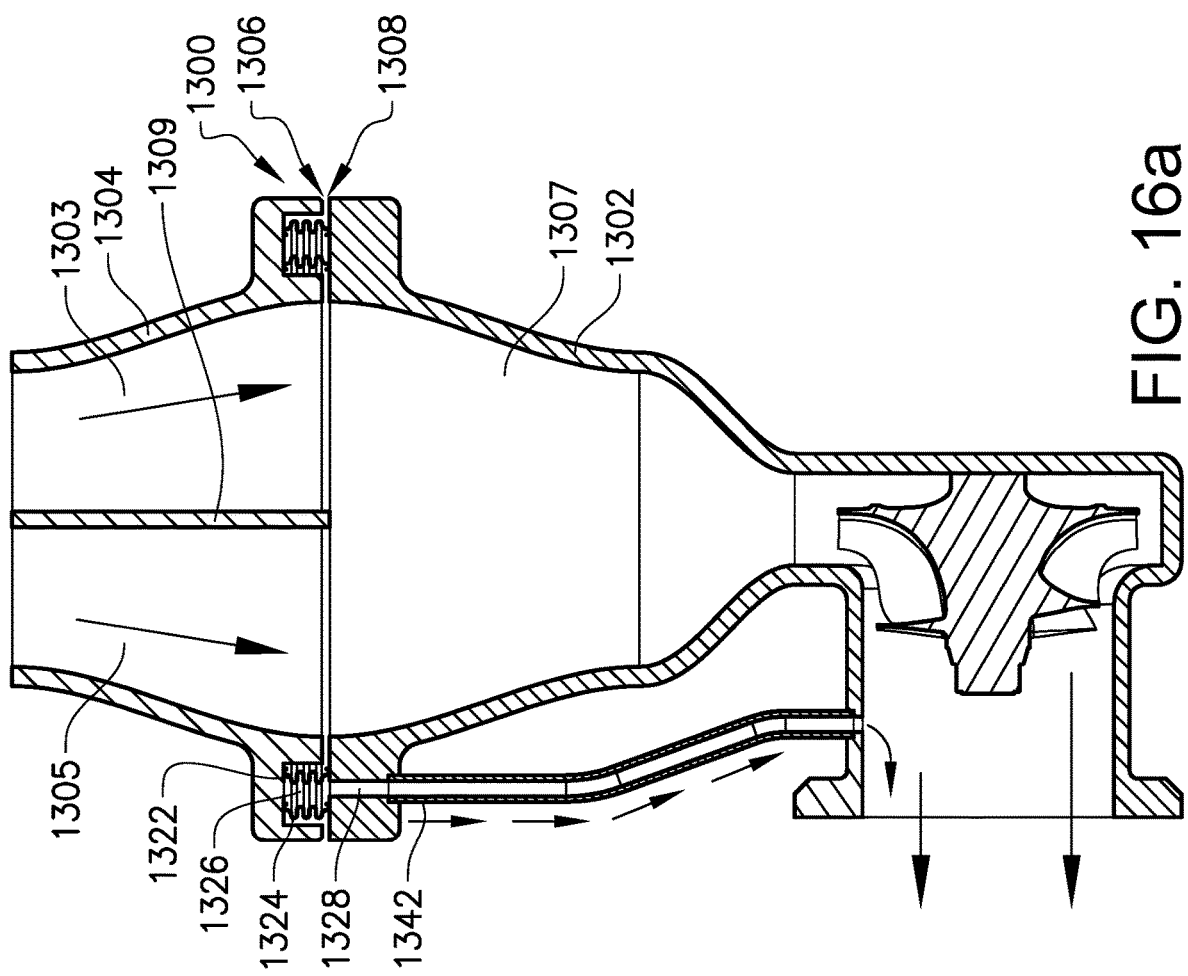

FIG. 16a, 16b show a conduit connection assembly 1300 according to an alternative embodiment to the one according to FIGS. 9 and 10. The assembly 1300 comprises a first conduit component 1302 having a first mating structure 1306 and a second conduit component 1304 having a second mating structure 1308 adapted to be mated with the first mating structure 1306. Further, the assembly comprises a sealing arrangement 1320 for sealing between the mating structures 1306, 1308.

The sealing arrangement 1320 comprises two spaced sealing members 1322, 1324 defining an intermediate space 1326. Further, the assembly comprises a pressure relief opening 1328 arranged in communication with the intermediate space 1326 between the two spaced sealing members 1322, 1324. A fluid line 1342 is, at a first end, in communication with a pressure relief opening 1328 and at a second end in communication with a downstream side of the turbine.

The second conduit component 1304 delimits two spaced internal, cavities 1303,1305 for conducting a fluid, wherein the first conduit component 1302 delimits a single exhaust gas channel 1307 adapted to match the boundary of both cavities 1303,1305 in the second conduit component 1304. Thus, two separate exhaust gas channels 1303, 1305 are joined into a single exhaust gas channel 1307 in the interface between the first conduit component 1302 and the second conduit component 1304.

More specifically, the two internal cavities 1303, 1305 are spaced via a division wall 1309. Each one of the two internal cavities 1303,1305 has the shape of a D in cross section, wherein the straight parts of the D-shapes are adjacent each other so that an outer boundary of the D-shaped internal cavities 1303,1305 forms an annular, elliptic or preferably substantially circular shape.

Each one of the two sealing members 1322,1324 has an annular, elliptic or preferably substantially circular shape matching the shape of the outer boundary of the D-shaped internal cavities 1303,1305 so that both sealing members 1322,1324 encompass both cavities 1303,1305.

The first conduit component 1302 comprises the pressure relief opening 1328.

FIG. 17a, 17b show a conduit connection assembly 1400 according to a further embodiment. The assembly 1400 comprises a first conduit component 1402 having a first mating structure 1406 and a second conduit component 1404 having a second mating structure 1408 adapted to be mated with the first mating structure 1406. The first conduit component 1402 is here formed by a part of a turbocharger and more specifically by a turbocharger housing in the form of a turbine inlet conduit of the turbocharger. The second conduit component 1404 is an exhaust gas conveying part of the exhaust gas outlet manifold 14. Further, the assembly comprises a sealing arrangement 1420 for sealing between the mating structures 1406, 1408.

The sealing arrangement 1420 comprises at least two spaced sealing members 1422,1424 defining an intermediate space 1426. The assembly 1400 further comprises a pressure relief opening 1428 arranged in communication with the intermediate space 1426 between the two spaced sealing members. The mating structure 1410, 1412 and sealing structure between the sealing members 1422,1424 is similar to what has already been described above and will therefore not be repeated here.

The assembly 1400 comprises a fluid line 1442, which at a first end 1434 is in communication with the pressure relief opening 1428 and at a second end 1436 adapted to be in communication with an environment V2' of substantially lower pressure than a pressure prevailing on an internal side of the assembly during operation. The environment V2' of substantially lower pressure is separate from a main conduit for an operational fluid to be conveyed between the first conduit component and the second conduit component, wherein the first and second conduit components 1402,1404 forms part of the main conduit. Thus, the main conduit for the operational fluid is here the conduit for exhaust gas from the engine. More specifically, the environment V2' of substantially lower pressure is formed by a space for collection of a secondary fluid. More specifically, the environment V2' of substantially lower pressure is formed by a space for collection of an oil for evacuation of the oil after use. In this case, the oil collection space is formed in a turbo housing and especially in a turbo bearing housing.

Further, the assembly 1400 comprises a further fluid line 1444 adapted for oil drainage from the oil collection space. The evacuation flow of exhaust gas from the pressure relief opening 1428 via the fluid line 1442 will then follow the oil drainage in the further fluid line 1444.

Although not shown, it may be noted that the conduit connection assembly 1400 comprises means for fastening one of the first conduit component 1402 and the second conduit component 1404 to an external structure. The fastening means may be arranged for fastening the one of the first conduit component 1402 and the second conduit component 1404 to the external structure 18 in a direction, which is transverse in relation to an axial direction X of the conduit connection assembly.

It is to be understood that the present invention is not limited to the embodiments described above and illustrated in the drawings; rather, the skilled person will recognize that many changes and modifications may be made within the scope of the appended claims.

The invention has above been described for the connection of a turbocharger to an exhaust manifold. However, the invention may be applied in any other portion of the exhaust system. Likewise, the invention has above been described for the connection of a turbocharger to an air intake manifold. However, the invention may be applied in any other portion of the air intake system.

The invention claimed is:

1. A conduit connection assembly comprising:
a first conduit component having a first mating structure; and
a second conduit component having a second mating structure being mated with the first mating structure;
a pressure relief opening;

a sealing arrangement for sealing between the first mating structure and the second mating structure;
wherein the sealing arrangement comprises at least two spaced sealing members defining an intermediate space; and
wherein the pressure relief opening is arranged in communication with the intermediate space between the two spaced sealing members;
a fluid line, which at a first end is in communication with the pressure relief opening and at a second end is in communication with an environment having a pressure being lower than a pressure prevailing on an internal side of the conduit connection assembly during an operational fluid;
wherein the environment having the pressure being lower than the pressure prevailing on the internal side of the conduit connection assembly, forms a part of a main conduit for the operational fluid to be conveyed between the first conduit component and the second conduit component.

2. The conduit connection assembly according to claim 1, wherein each one of the two spaced sealing members is continuous in a circumferential direction of the conduit assembly.

3. The conduit connection assembly according to claim 1, wherein the two spaced sealing members extend in a plane transverse to and perpendicular to an axial direction of the conduit connection assembly.

4. The conduit connection assembly according to claim 1, wherein each one of the first mating structure and the second mating structure has a portion with an at least partially radial extension, extending perpendicular to the axial direction of the assembly; and
wherein the sealing members are radially spaced between portions of the first mating structure and the second mating structure.

5. The conduit connection assembly according to claim 4, wherein the first mating structure portion comprises a first mating surface and the second mating structure portion comprises a second mating surface;
wherein each one of the first mating surface and the second mating surface has an extension transverse to and perpendicular to an axial direction of the conduit connection assembly; and
wherein the two radially spaced sealing members are arranged along the extension being transverse to and perpendicular to an axial direction of the conduit connection assembly.

6. The conduit connection assembly according to claim 1, wherein the first conduit component having a first radially projecting flange provided with the first mating structure; and
wherein the second conduit component having a second radially projecting flange provided with the second mating structure.

7. The conduit connection assembly according to claim 1, wherein at least one of the first mating structure and the second mating structure comprises at least one recess; and
wherein the at least two spaced sealing members are positioned in the at least one recess.

8. The conduit connection assembly according to claim 7, wherein the at least one recess is continuous in a circumferential direction of the conduit connection assembly.

9. The conduit connection assembly according to claim 7, wherein the pressure relief opening is arranged in the at least one recess.

10. The conduit connection assembly according to claim 1,
wherein the first conduit component delimits at least two spaced first internal cavities for conducting a fluid;
wherein the second conduit component delimits at least two spaced second internal cavities for conducting the fluid;
wherein a first one of the two spaced first internal cavities is in communication with a first one of the two spaced second internal cavities and a second one of the two spaced first internal cavities is in communication with a second one of the two spaced second internal cavities; and
wherein the sealing arrangement comprises at least three spaced sealing members defining the intermediate space.

11. The conduit connection assembly according to claim 1,
wherein at least one first sealing member is arranged to encompass a first pair of the two spaced first internal cavities and the two spaced second internal cavities;
wherein at least one second sealing member is arranged to encompass a second pair of the two spaced first internal cavities and the two spaced second internal cavities; and
wherein a third sealing member is arranged to encompass both pairs of the two spaced first internal cavities and the two spaced second internal cavities.

12. The conduit connection assembly according to claim 1,
wherein two first sealing members are arranged to encompass a first pair of the two spaced first internal cavities and the two spaced second internal cavities;
wherein two second sealing members are arranged to encompass a second pair of the two spaced first internal cavities and the two spaced second internal cavities.

13. The conduit connection assembly according to claim 1, wherein the conduit connection assembly comprises means for fastening one of the first conduit component and the second conduit component to an external structure.

14. The conduit connection assembly according to claim 13, wherein the fastening means is arranged for fastening said the one of the first conduit component and the second conduit component to the external structure in a direction, which is transverse in relation to an axial direction of the conduit connection assembly.

15. The conduit connection assembly according to claim 1, wherein the conduit connection assembly is to convey air to be distributed to the internal combustion engine and exhaust gas to be discharged from the internal combustion engine.

16. The conduit connection assembly according to claim 1, wherein the conduit connection assembly is for a turbocharger for being connected to an internal combustion engine.

17. The conduit connection assembly according to claim 16, wherein the turbocharger comprising a housing having means for fastening the turbocharger to a cylinder block of an internal combustion engine.

18. The conduit connection assembly according to claim 16, wherein the conduit connection assembly is positioned on an upstream side of a turbine in the turbocharger and wherein the second end of the fluid line is adapted to be positioned in an exhaust line on a downstream side of the turbine.

19. The conduit connection assembly according to claim 1, wherein the first conduit component is a turbine inlet conduit of a turbocharger associated with an internal combustion engine.

20. The conduit connection assembly according to claim 1, wherein the second conduit component is an exhaust gas conveying part, which is an exhaust gas outlet manifold for conveying exhaust gases discharged from an internal combustion engine.

21. The conduit connection assembly according to claim 1, wherein the first conduit component is a compressor outlet conduit of a turbo charger for an internal combustion engine.

22. The conduit connection assembly according to claim 21, wherein the second conduit component is an air inlet conduit for an internal combustion engine.

23. The conduit connection assembly according to claim 1, wherein the second conduit component is an air inlet conduit for an internal combustion engine.

24. A turbocharger comprising a conduit component being assembled to another conduit component;
wherein the conduit component has a first mating structure for mating with a second mating structure of the another conduit component;
wherein the first mating structure further comprises:
a pressure relief opening for being arranged in communication with an intermediate space between two spaced sealing members of a sealing arrangement for sealing between the first mating structure and the second mating structure;
wherein the two spaced sealing members define the intermediate space in an assembled state; and
wherein the conduit component is positioned on an upstream side of a turbine in the turbocharger, wherein the turbocharger comprises a fluid line, which at a first end is in communication with the pressure relief opening and at a second end is positioned in an exhaust line on a downstream side of the turbine.

25. The turbocharger according to claim 24, wherein the turbocharger comprises means for fastening the turbocharger to an external structure in a direction, which is transverse in relation to an axial direction of the turbocharger.

26. The turbocharger according to claim 24, wherein the turbocharger comprises a housing having means for fastening the turbocharger to a cylinder block of an internal combustion engine.

27. The internal combustion engine system comprising an internal combustion engine and a turbocharger according to claim 24,
wherein a conduit component interface connection defines a first fluid conducting volume which is, in an assembled state, associated to a second fluid conducting volume in the internal combustion engine system; and
wherein the pressure relief opening is to provide a communication between the intermediate space and the second fluid conducting volume.

28. The internal combustion engine system according to claim 27,
wherein the system comprises a fluid line, which at a first end is in communication with the pressure relief opening and which at a second end is to be in communication with an environment having a pressure being lower than a pressure prevailing on an internal side of the first mating structure during an operational fluid.

29. A conduit connection assembly comprising;
a first conduit component having a first mating structure;
a second conduit component having a second mating structure being mated with the first mating structure;
a pressure relief opening;
a sealing arrangement for sealing between the first mating structure and the second mating structure;
wherein the sealing arrangement comprises at least two spaced sealing members defining an intermediate space; and
wherein the pressure relief opening is arranged in communication with the intermediate space between the two spaced sealing members;
a fluid line, which at a first end is in communication with the pressure relief opening and at a second end is in communication with an environment having a pressure being lower than a pressure prevailing on an internal side of the conduit connection assembly during an operational fluid;
wherein the environment having the pressure being lower than the pressure prevailing on the internal side of the conduit connection assembly, is separate from a main conduit for the operational fluid to be conveyed between the first conduit component and the second conduit component, and
wherein the environment having the pressure being lower than the pressure prevailing on the internal side of the conduit connection assembly is formed by a space for collection of a fluid.

30. The conduit connection assembly according to claim 29, wherein the environment having the pressure lower than the pressure prevailing on the internal side of the conduit connection assembly is formed by a space for collection of an oil for evacuation of the oil after use.

31. An internal combustion engine system comprising:
a conduit connection assembly;
wherein the conduit connection assembly further comprises:
a first conduit component having a first fluid conducting volume and a first mating structure;
a second conduit component having a second fluid conducting volume and a second mating structure being mated with the first mating structure;
wherein the first fluid conducting volume being in an assembled state is associated to the second fluid conducting volume in the internal combustion engine system;
a pressure relief opening;
a sealing arrangement for sealing between the first mating structure and the second mating structure;
wherein the sealing arrangement comprises at least two spaced sealing members defining an intermediate space; and
a fluid one, which at a first end is in communication with the pressure relief opening and at a second end is in communication with an environment having a pressure being lower than a pressure prevailing on an internal side of the conduit connection assembly during an operational fluid;
wherein the pressure relief opening is arranged in communication with the intermediate space between the two spaced sealing members;
wherein the pressure relief opening is provided a communication between the intermediate space and the second fluid conducting volume; and
wherein the environment having the pressure being lower than a pressure prevailing on an internal side of the conduit connection assembly, forms a part of a main conduit for an operational fluid to be conveyed between the first conduit component and the second conduit component.

32. The internal combustion engine system according to claim 31, wherein the second end of the fluid pressure relief line is positioned in an exhaust line downstream of the first end.

33. The internal combustion engine system according to claim 31, wherein the internal combustion engine system comprises a turbocharger, wherein the conduit connection assembly is positioned on an upstream side of a turbine of the turbocharger; and
wherein the second end of the fluid pressure relief line is positioned in an exhaust line on a downstream side of the turbine of the turbocharger.

34. An internal combustion engine system comprising:
a conduit connection assembly;
wherein the conduit connection assembly further comprises:
a first conduit component having a first fluid conducting volume and a first mating structure;
a second conduit component having a second fluid conducting volume and a second mating structure being mated with the first mating structure;
wherein the first fluid conducting volume being in an assembled state is associated to the second fluid conducting volume in the internal combustion engine system;
a pressure relief opening;
a sealing arrangement for sealing between the first mating structure and the second mating structure;
wherein the sealing arrangement comprises at least two spaced sealing members defining an intermediate spaced; and
a fluid line which at a first end is in communication with the pressure relief opening and at a second end is in communication with an environment having a pressure being lower than a pressure prevailing on an internal side of the conduit connection assembly an operational fluid;
wherein the pressure relief opening is arranged in communication with the intermediate space between the two spaced sealing members; and
wherein the pressure relief opening is provided a communication between the intermediate space and the second fluid conducting volume;
wherein the second end of the fluid pressure relief line is positioned separate from a main conduit for an operational fluid to be conveyed between the first conduit component and the second conduit component;
wherein the environment the pressure being lower than a pressure prevailing on the internal side of the conduit connection assembly, is separate from a main conduit for the operational fluid to be conveyed between the first conduit component and the second conduit component; and
wherein the environment having the pressure being lower than a pressure prevailing on the internal side of the conduit connection assembly is formed by a space for collection of a fluid.

* * * * *